United States Patent [19]

Whewell

[11] 4,308,568
[45] Dec. 29, 1981

[54] ANTISTATIC CONSTRUCTION

[75] Inventor: Bruce R. Whewell, Henley-on-Thames, England

[73] Assignee: Industrial Heating Systems, Inc., Pittsburgh, Pa.

[21] Appl. No.: 158,799

[22] Filed: Jun. 12, 1980

[51] Int. Cl.³ .................. B32B 3/16; H05F 3/02
[52] U.S. Cl. .................. 361/216; 156/154; 156/298; 252/511; 427/203; 427/355; 428/144; 428/325; 428/332; 428/408; 428/409; 428/922
[58] Field of Search .............. 428/922, 144, 150, 325, 428/331, 332, 432, 409, 408; 427/202, 203, 204, 355; 156/242, 298, 154, 71; 252/511; 361/215, 216

[56] References Cited

U.S. PATENT DOCUMENTS

| 2,323,461 | 7/1943 | Donelson | 361/216 |
| 2,378,623 | 6/1945 | Donelson et al. | 361/216 |
| 2,734,007 | 2/1956 | Toulmin, Jr. | 428/922 |
| 2,851,639 | 9/1958 | Ford et al. | 361/216 |
| 3,121,825 | 2/1964 | Abegg et al. | 361/216 |
| 4,208,696 | 6/1980 | Lindsay et al. | 428/922 |
| 4,219,602 | 8/1980 | Conklin | 428/408 |

*Primary Examiner*—Michael G. Wityshyn
*Attorney, Agent, or Firm*—Arnold B. Silverman

[57] ABSTRACT

An antistatic construction including a base member, a first electrically nonconductive layer on the base member, and an electrically conductive layer on the first electrically nonconductive layer. A second electrically nonconductive layer may be provided on the electrically conductive layer. A plurality of electrically nonconductive elements embedded within at least one of said layers. Portions of the electrically conductive layer adjacent to the electrically nonconductive elements being exposed. At least one electrically grounded electrical conductor operatively associated with the electrically conductive layer.

The method of creating an antistatic construction.

20 Claims, 3 Drawing Figures

ANTISTATIC CONSTRUCTION

BACKGROUND OF THE INVENTION

1. Field of the Invention

This invention relates to antistatic constructions and, more specifically, it relates to unique multi-layer assemblies which are adapted to provide conductive or antistatic coverings for floors, walls and other types of base members.

2. Description of the Prior Art

In many environments, including many industrial environments, it is essential or desirable to eliminate or minimize the hazard of explosion or fire due to static electricity or mechanical sparks. Typical of such environments are industrial locations which manufacture or handle explosive powders or other flammable or explosive materials, environments where heavy dust buildup is common as well as other environments where for safety or other objectives it is desirable to have a means for grounding electrical charges.

It has been known to provide a series of electrical grid members in the nature of wire mesh as a means for withdrawing electrical charge from an environment. Such systems may rely on electrical conduction through a thick resistive layer to a series of conductive grid members.

In view of the increasing emphasis being placed upon the value of human life and individual safety both in industrial and other environments, there is increasing need for a means for effectively, economically and durably establishing improved conditions of safety in respect of the hazards of static electricity or mechanical sparks.

SUMMARY OF THE INVENTION

The above-described need has been met by the present invention. In the present invention, a base member which may be a floor of a building, an exterior walkway or surface, a wall or other member is first covered with a layer of electrically nonconductive material. A layer of electrically conductive material is provided thereon. A second electrically nonconductive layer may be provided on the electrically conductive layer. A plurality of electrically nonconductive elements are embedded within the assembly such that portions of the electrically conductive layer are exposed to the adjacent environment in regions close to the electrically nonconductive elements. At least one grounded electrical conductor is operatively associated with the electrically conductive layer.

It is an object of the present invention to provide an antistatic construction and the method of establishing the same so as to dissipate undesired and potentially hazardous static electricity charges.

It is a further object of this invention to provide such construction which is highly resistant to chemical and abrasive destruction as well as establishing a non-skid surface.

It is another object of this invention to provide such a construction which will comply with established safety standards.

It is a further object of this invention to provide such a construction which is readily adaptable to a wide variety of needs and may be economically adopted and employed.

These and other objects of the invention will be more fully understood from the following description of the invention on reference to the illustrations appended hereto.

DESCRIPTION OF THE PREFERRED EMBODIMENT

Figure 1:
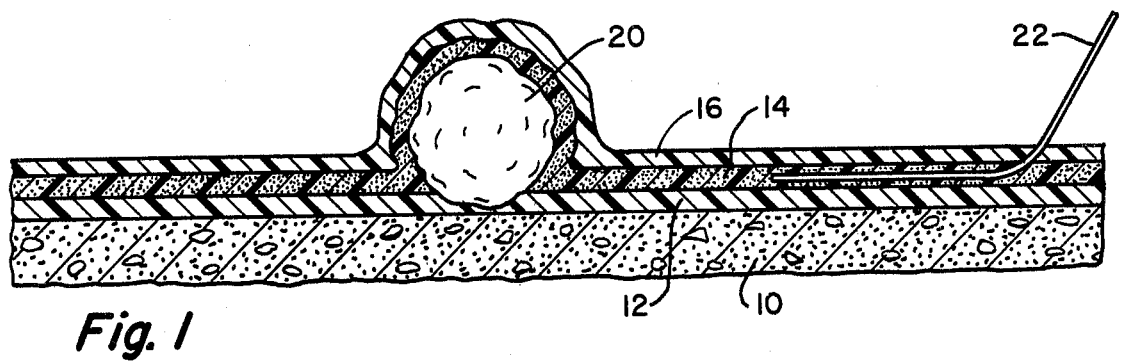
FIG. 1 is a fragmentary, schematic, cross-sectional illustration of an intermediate stage of establishing a form of antistatic construction of the present invention.

Referring now in greater detail to FIG. 1 there is shown a base member which, in the form shown, is a concrete floor 10. Applied to the concrete floor and preferably intimately bonded thereto either through self-adhesive properties of the coating material or through independent adhesive is a first electrically nonconductive layer 12. Secured in overlying relationship with respect to the first electrically nonconductive layer 12 is electrically conductive layer 14. In the form shown, in overlying relationship and secured to the electrically conductive layer 14 is electrically nonconductive layer 16. A plurality of electrically nonconductive elements 20 are secured at discrete locations within the multi-layer construction. An electrode 22 which is suitably secured to an electrical ground (not shown) by any conventional means is in electrical contact with electrically conductive layer 14.

Referring still to FIG. 1, in establishing the intermediate stage of the antistatic construction of FIG. 1, after suitable preparation of the surface of base member 10 as by cleaning the same thoroughly, the first electrically nonconductive layer 12, which may advantageously be applied as a coating, is applied. A plurality of electrically nonconductive elements is then distributed onto the first electrically nonconductive coating 12, preferably in such fashion as to provide a concentration of particles of about 15 to 40 particles per square inch of base member 10 to be covered. After an appropriate setting time for the first electrically nonconductive coating 12, the electrically conductive coating 14 is applied. It will be noted that the electrically conductive coating 14 shown in FIG. 1 covers the electrically nonconductive elements 20. After an appropriate setting time, the second electrically nonconductive coating 16 is applied and is allowed to set.

Figure 2:
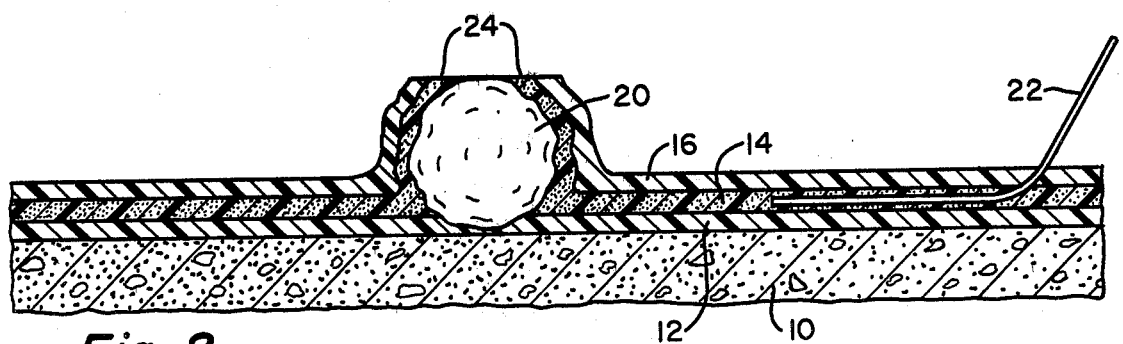
FIG. 2 is a fragmentary, schematic illustration of a section of flooring protected by the antistatic construction of the present invention.

Referring now to FIG. 2, after an appropriate setting time, it is desired to, by an abrasive such as sandpaper, contact the upper portions of second electrically nonconductive coating 16 so as to remove portions thereof and expose the upper portions 24 of the electrically conductive coating 14 so as to permit the electrically conductive material to be in communication with the surrounding environment. In this fashion, it will be appreciated that any static electricity which would tend to build in the environment will be subjected to the action of the exposed portion 24 of electrically conductive layer 14 and will be harmlessly tapped away through grounded electrode 22.

While for convenience of reference herein emphasis will be placed upon an antistatic floor system, it will be appreciated that the system is equally adapted to walls, exterior surfaces and other base members with respect to which such protection is desired. Also, where a conductive floor or other member is desired, the system will be equally applicable.

Figure 3:
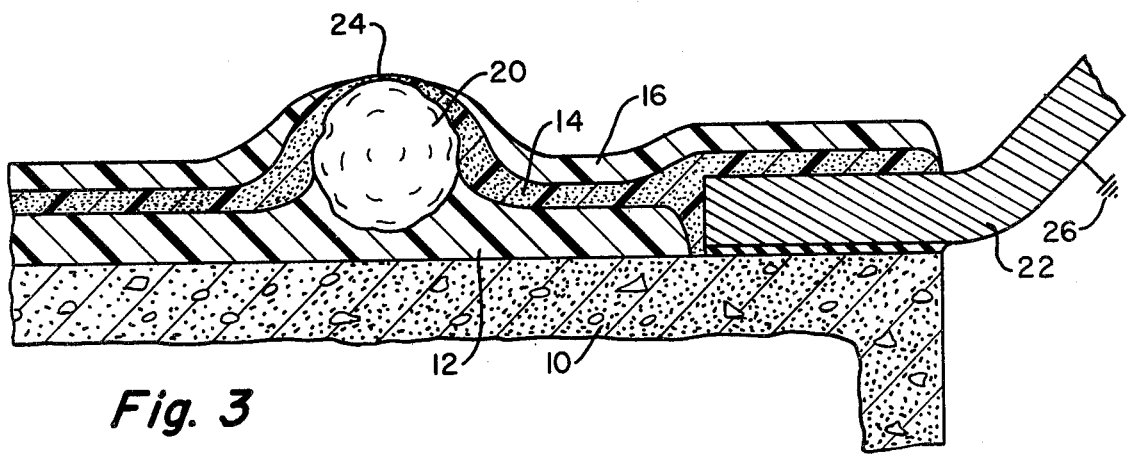
FIG. 3 is a fragmentary, schematic, cross-sectional illustration showing further details of a floor construction of the present invention.

Referring now to FIG. 3, further details of the construction will be illustrated. In the embodiment shown in FIG. 3, unlike the two-stage method shown in FIGS. 1 and 2, the second nonconductive coating 16 is applied in such fashion as to be self-leveling and in the region of element 20 will permit either direct exposure of conductive layer 24 or coverage of conductive layer 24 by such a thin layer of coating 16 as to permit flow of electricity to layer 24 through layer 16. It will be seen that the upper surface 24 of layer 14 provides a conductive path to ground in communication with the overlying surrounding environment. The electrode 22 may advantageously be made from a suitably electrically conductive material such as copper strip and preferably should have at least about 3 to 4 inches of the electrode overlying or in contact with electrically conductive layer 14.

The particles 20 serve to provide a nonslip surface and to provide high points in the upper surface of the assembly where charge leakage from the adjacent environment to the electrically conductive layer 14 will occur.

One of the preferred materials for use as the electrically nonconductive elements 20 is solid, substantially spherical glass particles having a diameter of about 400 to 500 microns. In addition to providing suitable strength in respect of the load-bearing properties of the resultant floor or other construction, the spherical configuration avoids undesired stress concentrations which could be potentially destructive of the antistatic construction. Also, the spherical configuration results in symmetry with respect of orientation of the individual elements 20 in the assembly. The preferred spherical element also serves to resist undesired mechanical sparking.

With respect to layers 12, 16 it is generally preferred that these be applied as a coating and that these be composed of a suitable epoxy material. Epoxy not only is relatively economical to use and possesses the desired adhesive and strength characteristics, but also provides suitable wearing properties. A preferred form of conductive layer 14 is also applied as a coating and consists of an epoxy which has been converted into an electrically conductive material through the addition of conductive materials. Among the preferred conductive materials are wet ground graphite and colloidal carbon particles such as the materials disclosed in U.S. Pat. No. 3,696,054, the disclosure of which is expressly incorporated herein by reference. The electrically conductive layer 14 preferably has a resistivity in the range of less than about 5000 ohms/square. For this purpose, a square is defined as an electrically conductive region in the shape of a square having a pair of parallel electrodes of equal length providing two sides of a square and the spacing between the electrodes being equal to their length.

EXAMPLE

In order to provide greater insight into a specific application of the present invention, a detailed example will now be considered. In the example, a base member consisting of a rectangular concrete floor will be employed. Initially, the floor should be clean and dry with particular effort made to eliminate any grease or oil on the surface. A copper electrode which will connect the electrically conductive coating with the electrical ground should have the portion which will contact the coating cleaned, as by sanding, so as to eliminate any oxide and dirt and provide for more intimate electrical contact. Contact cement or another appropriate adhesive is employed to secure the electrode with about a 3 or 4 inch axial segment minimum being secured to the concrete floor. A band approximately one inch wide of conductive material, such as the material out of which the conductive layer 15 is made, is applied to the floor along the outer perimeter of the rectangular floor and in contact with the electrode. The epoxy which will be used in the nonconductive lower coating is then mixed to the precise desired proportions as in a Jiffy mixer and is applied to the floor by means of a brush or roller in a thickness of approximately 10 mils. This base coat is applied within the rectangular area defined by the band of conductive material but not on the electrode or the band. (See FIG. 3.) This is allowed to dry for about 16 to 24 hours. While the lower or first electrically nonconductive coating is drying the glass spherical electrically nonconductive elements having a diameter of about 450 microns are spread over the base coat as by hand scattering so as to employ approximately one pound per 30 to 40 square feet of floor surface. The electrically conductive coating material in the form of an epoxy containing wet ground graphite and colloidal size carbon particles in accordance with the teachings of U.S. Pat. No. 3,696,054 are applied in a coating thickness of about 5 mils. This coating is allowed to dry for approximately 16 to 24 hours. The epoxy coating for the second electrically nonconductive coating is then mixed and applied in a thickness of approximately 5 mils. This is allowed to dry for approximately 36 to 48 hours before permitting floor traffic.

In the event the assembly at this stage appears more like FIG. 1 than FIG. 3, positive action to expose the conductive layer is required. By means of a suited abrasive material such as sandpaper, emory cloth, abrasive block or other similar material, the upper coating is subjected to abrasive reaction so as to expose portions of the electrically conductive coating to the environment.

It will be appreciated, therefore, that the present invention provides an economical and effective means for establishing an antistatic or conductive construction which is nonskid as well as chemical and wear resistant. In addition, the installation is simple to establish and durable. It provides discrete regions for leakage of charge as to a protected electrically conductive layer. The system specifically described by way of example above meets NFPA STANDARD 651 (1972) "Standard for the Prevention of Dust Explosions in the Manufacture of Aluminum Powder" as well as other standards. The method of installation is simple and may readily be accomplished by semi-skilled individuals.

While for convenience of reference and simplicity of disclosure, certain specific materials have been disclosed herein and these represent the best mode of practice of the invention known to applicant, it will be apparent to those skilled in the art that other combinations may readily be employed without departing from the scope of the present invention. While spherical glass particles having a diameter of about 400 to 500 microns have been suggested, it will be appreciated that other materials may be employed. For example, sand, gravel and plastic particles may readily and advantageously be employed. These other materials should preferably have an average particle size of about 400 to 500 microns. In addition, while the preferred material for the conductive layer has been disclosed, it will be appreciated that other materials, such as aluminum foil strips and coatings having metal particles therein, for example, may be employed.

While for simplicity of reference the disclosure has centered around a discussion of the use of a single electrode, it will be appreciated that in general more than one electrode may be employed depending upon the size of the base member to be covered and the desired efficiency of electrical conduction desired. These may generally be spaced from each other about the periphery of the base member.

While for most uses the assembly will consist of three layers, such as layers 12, 14, 16, for some uses, such as walls or other surfaces which are not wearing surfaces, for example, second nonconductive layer may be eliminated, if desired.

Whereas particular embodiments of the invention have been described above for purposes of illustration, it will be evident to those skilled in the art that numerous variations of the details may be made without departing from the invention as defined in the appended claims.

I claim:

1. An antistatic construction comprising
   a base member,
   a first electrically nonconductive layer disposed on said base member,
   an electrically conductive layer disposed on said first electrically nonconductive layer,
   a plurality of electrically nonconductive elements embedded within at least one of said layers,
   portions of said electrically conductive layer adjacent to said elements being exposed, and
   grounded electrical conductor means operatively associated with said electrically conductive layer.

2. The antistatic construction of claim 1 including said base member being a floor.

3. The antistatic construction of claim 1 including said base member being a wall.

4. The antistatic construction of claim 1 including
   a second electrically nonconductive layer disposed on said electrically conductive layer.

5. The antistatic construction of claim 4 including all said layers being provided as coatings, and said coatings including epoxy.

6. The antistatic construction of claim 4 including
   said electrically conductive layer being a substantially continuous coating.

7. The antistatic construction of claim 6 wherein said coating includes colloidal carbon particles.

8. The antistatic construction of claim 6 wherein said coating includes comminuted graphite.

9. The antistatic construction of claim 8 including
   said coating having a resistivity of less than about 5000 ohms/square.

10. The antistatic construction of claim 1 including said electrically nonconductive elements including glass particles.

11. The antistatic construction of claim 10 including at least a major number of said glass particles being substantially spherical and having a diameter of about 400 to 500 microns.

12. The antistatic construction of claim 1 including
    said grounded electrical conductor means including a copper electrode in electrical contact with said electrically conductive layer.

13. A method of creating an antistatic construction comprising
    providing a base member,
    applying a first electrically nonconductive layer on said base member,
    distributing a plurality of electrically nonconductive elements on said first electrically nonconductive layer,
    applying an electrically conductive layer on said first electrically nonconductive layer, and
    placing grounded electrical conductor means in electrical contact with said electrically conductive layer.

14. The method of claim 13 including
    applying a second electrically nonconductive layer on said electrically conductive layer.

15. The method of claim 14 including
    said electrically conductive layer having a resistivity of less than about 5000 ohms/square.

16. The method of claim 14 including
    removing portions of said second electrically nonconductive layer to expose portions of said electrically conductive layer.

17. The method of claim 14 including
    providing said layers as coatings.

18. The method of claim 17 including
    providing said base member as a floor.

19. The method of claim 17 including
    providing graphite in said electrically conductive coating.

20. The method of claim 17 including
    each of said coatings including epoxy, and
    permitting each said coating to set before applying the next said coating.

* * * * *